Oct. 11, 1960 H. P. POWERS 2,955,485
AUXILIARY GAS PEDAL
Filed July 6, 1959
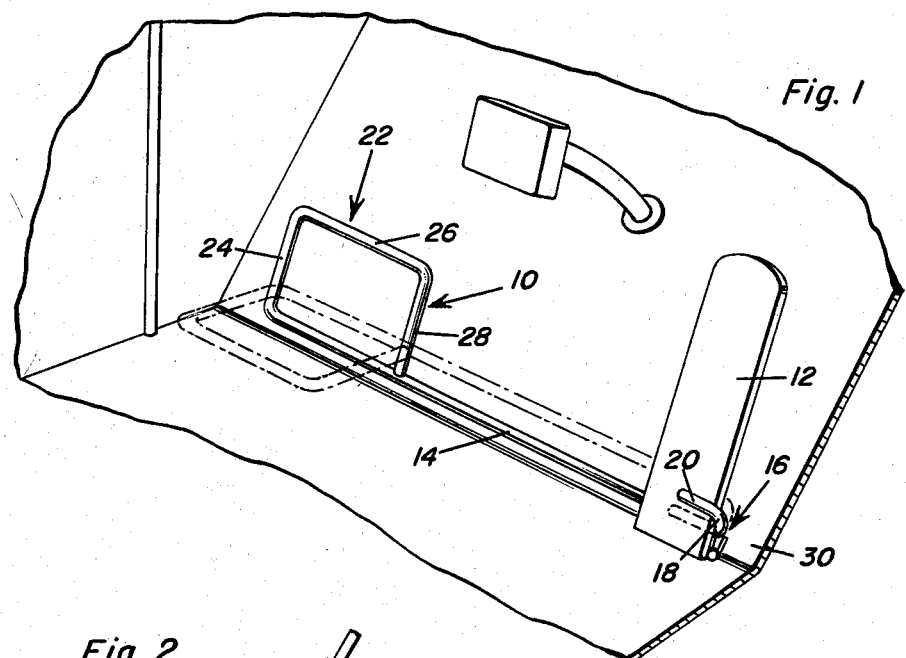
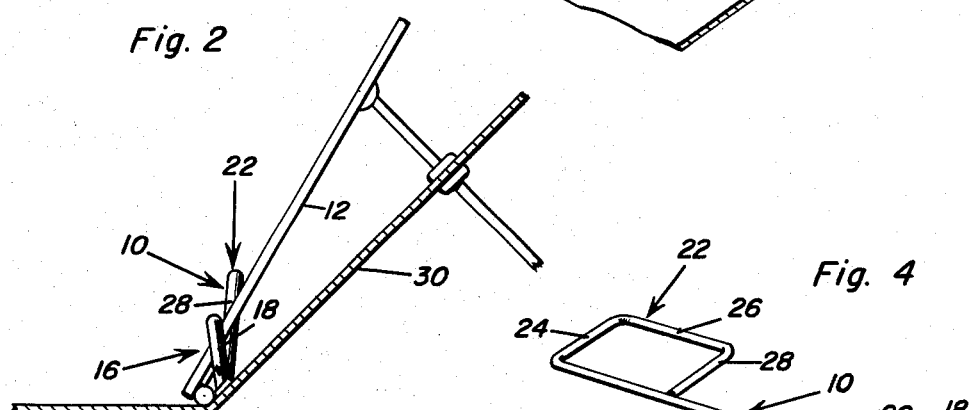
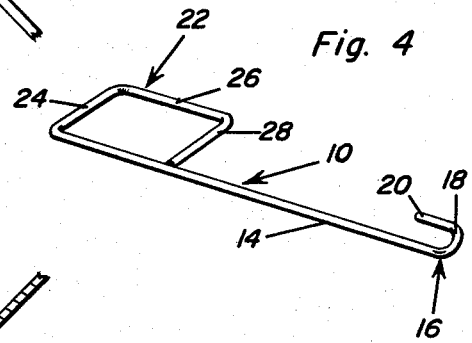
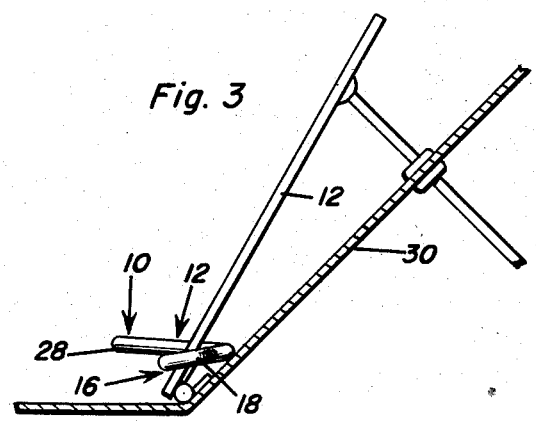
Homer P. Powers
INVENTOR.

United States Patent Office 2,955,485
Patented Oct. 11, 1960

2,955,485

AUXILIARY GAS PEDAL

Homer P. Powers, 605 E. Logan, Gallup, N. Mex.

Filed July 6, 1959, Ser. No. 825,334

11 Claims. (Cl. 74—562.5)

This invention relates to a novel and useful auxiliary gas pedal for motor vehicles which is adapted to have one end positioned for ready engagement by the left foot of a driver of a motor vehicle with the other end frictionally engaged with the conventional gas pedal of the motor vehicle whereby the conventional gas pedal may be depressed by the left foot of the operator of the vehicle.

In many instances, while driving great distances, the driver of a vehicle becomes uncomfortable in that he has to remain in substantially the same position for extended periods of time. Frequently vehicle operators will remove their right foot from the conventional gas pedal and operate the latter with their left foot in order that their legs may be rested by assuming varying positions throughout an extended motor trip. The placement of the left foot across the body and in engagement with the conventional form of gas pedal to operate the latter has in the past caused accidents which could have been prevented if there were another means for operating the conventional gas pedal by means of the left foot of a vehicle operator without necessitating the placement of the left foot across the body and onto the conventional gas pedal. The crossing over of the left foot to engage the conventional gas pedal can cause considerable confusion if the operator of the vehicle is suddenly required to apply the brakes. In this instance, it is quite possible that the operator of a vehicle would encounter delay, considering the urgency of the situation, while attempting to cross over his left foot with his right foot to apply the brakes. Further, during the process of crossing over his left foot with his right foot to apply the brakes, one foot could strike the other to cause the right foot to either completely miss the brake pedal or to engage the same in a glancing motion which could cause a still further delay in the application of the brakes.

Still further, while driving for extended periods of time, the operator of a motor vehicle will sometimes not realize that his right foot is progressively applying more pressure to the accelerator pedal thereby increasing the speed of the automobile beyond that which is safe for the road conditions under which he is driving. Many vehicle operators whose intent it is to drive within the speed limits have been greatly surprised by the familiar sound of a police siren instructing them to pull over to the side of the road and stop because they have unknowingly and unintentionally increased the speed of the vehicle which they were driving beyond the posted speed limit.

The main object of the invention is to provide a device which will greatly add to the comfort of the driver of a vehicle while he is driving on the highway for extended periods of time.

More specifically, a further object is to provide a means whereby the driver of a vehicle may safely and conveniently operate the accelerator pedal of the vehicle which he is driving with his left foot while the latter is in a comfortable and convenient position leaving the right foot entirely free and unobstructed by the left foot to apply the brakes should the necessity suddenly arise.

A still further object of this invention is to provide a means whereby the auxiliary gas pedal may be so engaged with the conventional gas pedal to vary the force required thereon to depress the conventional gas pedal thereby enabling the operator of a vehicle to merely rest his left foot upon the attachment in order to maintain the desired speed.

Still another object of this invention is to provide an auxiliary gas pedal attachment that may be engaged with the conventional form of gas pedal and so positioned so that the attachment may be engaged with the left foot while the conventional gas pedal is engaged by the right foot, the pressure of the left foot being so transmitted to the conventional form of gas pedal so as to balance the presssure applied thereto by the right foot whereby the operator of a vehicle may conveniently rest each foot on the appropriate pedal without applying pressure thereto other than the weight of the corresponding foot to maintain a predetermined gas pedal setting.

A final object to be specifically enumerated herein is to provide an auxiliary gas pedal attachment for motor vehicles which will conform to conventional forms of manufacture, be of simple construction, and readily adaptable to substantially every motor vehicle utilizing the conventional form of gas pedal thereby to provide a device which will be economically feasible, long lasting and easily attached to a motor vehicle by the operator thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the invention shown attached to the conventional form of gas pedal and in a position whereby the attachment may be engaged by the left foot of an operator to depress the gas pedal, an alternate position of the attachment being shown in phantom lines whereby the driver of a vehicle may engage the attachment with his left foot to equalize the force applied to the accelerator by his right foot in order to rest both feet while maintaining the same gas pedal setting;

Figure 2 is a side elevational view of the invention as seen from the right side of Figure 1 with the attachment in position to be engaged by the left foot of a motor vehicle operator to depress the gas pedal;

Figure 3 is an end elevational view of the attachment as seen in Figure 1 in phantom lines; and Figure 4 is a perspective view of the invention on a reduced scale.

Referring now more specifically to the drawings, the numeral 10 generally designates the attachment comprising the present invention which is shown having one end engaged with a conventional form of gas pedal 12, see Figure 1.

The attachment 10 comprises an elongated shaft 14 having on one end a laterally extending hook portion generally referred to by the reference numeral 16. The hook portion 16 is formed by a laterally projecting portion 18 formed on one end of the shaft 14 which terminates in a backturned portion 20 which is substantially parallel to and spaced from the shaft 14. Formed on the other end of the shaft 14 is a frame generally referred to by the reference numeral 22 which is formed by a laterally projecting portion 24 from which extends a backturned portion 26 which in turn terminates in an angulated portion 28 which is substantially parallel to the laterally projecting portion 24 and is disposed in abutting relation with the shaft 14.

It will be noted that the frame 22 and the hook 16 are formed integral with the shaft 14 and that the frame 22 is substantially rectangular in shape, this being the preferred form although it is to be further understood that any desired shape of frame may be utilized.

The hook 16 is adapted to engage the right side of the conventional form of gas pedal 12, see Figure 1, with the back-turned portion 20 frictionally engaging the upper surface of the gas pedal 12 and the shaft 14 engaging the lower surface thereof.

The gas pedal attachment 10 is adapted to rest upon the floor board 30 and extend from the conventional gas pedal 12 to a point to the left thereof readily engageable by the left foot (not shown) of the operator of a motor vehicle. Further, as best illustrated by Figure 1, the attachment 10 may be positioned in either of two positions. The first of these positions is shown in solid lines in Figure 1 wherein the attachment 10 is so positioned so that the frame 22 is positioned at an inclination similar to that of the conventional gas pedal 12, see Figure 2. When the attachment 10 is in this position, the left foot of the operator of the vehicle may be placed upon the frame 22 and pressure applied to the backturned portion 26 to rotate the attachment 10 about the longitudinal axis of the shaft 14 which causes the opposed surfaces of the backturned portion 20 and the shaft 14 to engage the upper and lower surfaces respectively of the gas pedal 12 to depress the same.

It will be noted that the hook portion 16 may be slidably positioned longitudinally of the gas pedal 12. The selective longitudinal positioning of the hook portion 16 along the accelerator pedal 12 will in effect afford greater leverage to depress the accelerator 12 upon the movement of the backturned position 26 toward the floor board 30 when the hook portion is engaged with an upper portion of the gas pedal 12 while the positioning of the hook portion 16 on a lower portion of the gas pedal 12 will offer less leverage in depressing the gas pedal 12. Therefore, the longitudinal positioning of the hook portion 16 along the gas pedal 12 will enable the driver of a vehicle to so position the attachment whereby it will require more or less pressure upon the frame 22 to depress the accelerator pedal 12.

The second position of the attachment 10 as shown in phantom lines in Figure 1 positions the frame 22 in a substantially horizontal position with the confronting surfaces of the backturned portion 20 and the shaft 14 still frictionally engaged with the upper and lower surfaces of the conventional gas pedal 12 respectively. When the attachment 10 is in this position, the left foot of the operator of a motor vehicle may be positioned thereon. The positioning of the attachment 10 in this manner enables the operator of a vehicle to substantially equalize the pressure applied to the gas pedal 12 by his right foot by the pressure applied to the frame 22 by his left foot enabling the operator of the vehicle to completely relax both feet while maintaining the same selected gas pedal setting.

The hook portion 16 may also be moved longitudinally of the gas pedal 12 while the same is in the position as set forth in the preceding paragraph whereby the desired leverage may be attained to completely equalize the pressures of the right and left feet of the operator of the vehicle should the pressure of one foot be greater than the pressure of the other foot due to a particular position of the driver.

While the backturned portion 20 is sufficiently spaced from the shaft 14 to enable the confronting surfaces of each to frictionally engage the opposite surfaces of the gas pedal 12 at points spaced longitudinally thereof which positions the frame at an inclination close to that of the gas pedal 12 while the frame is in an upright position as shown in Figure 2, the planes of the frame 22 and the hook portion 16 form an acute angle whereby the inclination of the frame 22 may be established closer to that of the gas pedal 12.

Further, it is to be noted that the length of the frame 22 relative to that of the gas pedal 12 is substantially less which requires that more pressure be brought to bear by the left foot of an operator on the frame 22 in order to depress the gas pedal 12 than that which is normally required by the right foot engaged with the gas pedal 12. The shorter frame 22 requiring greater pressure by the left foot of an operator in order to depress the gas pedal 12 compensates for the necessarily weaker and lesser adept left foot for maintaining a predetermined gas pedal setting. Since most drivers of vehicles have not in the past used auxiliary gas pedals of the type which may be operated by the left foot, the left foot of these operators would necessarily be less sensitive to changes in position and less able to maintain a specific amount of pressure upon such an attachment. Therefore, although this is the preferred construction and it is to be understood that a frame of any desired length may be utilized, the frame which is shorter than the gas pedal enables a greater variance in the pressure applied thereto before a change in the gas pedal setting is effected.

Further, any other dimensions of the attachment 10 can be varied to enable it to be more easily installed and it will be noted that the attachment 10 may be easily attached to a gas pedal by merely positioning the hooked portion 16 thereabout, which positioning does not require the use of any tools and which hooked portion 16 enables the attachment 10 to be readily transferred from one vehicle to another.

It can readily be seen therefore that herein described is an auxiliary gas pedal which has been designed to be capable of perfect operation by substantially every operator of motor vehicles under varying conditions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a vehicle having a gas pedal hingedly secured at its lower end to the floorboard of the vehicle and normally urged to an inclined upwardly extending position, an auxiliary gas pedal attachment comprising an elongated shaft loosely supported upon the floorboard and of such a length as to extend laterally from the conventional gas pedal of the vehicle to a point spaced therefrom at which it is readily engageable by the left foot of the driver of the vehicle, said shaft in a first position passing beneath a lower portion of said pedal and terminating in a relatively short laterally directed portion which in turn terminates a spaced distance from said shaft in a backturned portion overlying an upper portion of said pedal and forming a hook on said one end of said shaft, the other end of said shaft having a laterally extending pedal frame thereon which is adapted to be engaged by the left foot of a vehicle driver, opposing surfaces of said shaft and backturned portion engaging the upper and lower surfaces of said gas pedal respectively at spaced points longitudinally therealong, said backturned portion being spaced from said shaft by said laterally directed portion a distance greater than the thickness of said pedal to loosely embrace the latter and yet small enough to enable said attachment to be pivoted about the longitudinal axis of said shaft to a second position with the shaft disposed beneath and in frictional engagement with an upper portion of said pedal and the backturned portion disposed above and in frictional engagement with a lower portion of said pedal with pedal frame disposed substantially horizontally with the free edge thereof adjacent the driver's position of the vehicle, whereby the driver may rest his left foot on the pedal frame in the second position to equalize the weight of his right foot on the gas pedal and to maintain a selected position of the gas pedal.

2. The combination of claim 1 wherein the planes of said hook and said frame form an acute angle so as to establish an inclination of the frame more closely similar to that of the gas pedal, when said attachment is positioned to depress the gas pedal upon downward movement of the free end of said frame.

3. The combination of claim 1 wherein said hook is adapted to slidably embrace the gas pedal so that it may be moved longitudinally of the gas pedal to afford more or less leverage.

4. The combintion of claim 1 wherein said attachment is of integral construction with said hook being formed by two right angled bends in the same direction and said frame being formed by three right angled bends in the same direction.

5. The combination of claim 1 wherein said frame is integral with said shaft being formed by three right angled bends in the same direction.

6. An auxiliary gas pedal attachment comprising an elongated shaft adapted to rest loosely upon the floor board of a motor vehicle and of such a length as to extend laterally from the conventional gas pedal to a point spaced therefrom and where it may be readily engageable by the left foot of a driver of the vehicle, said shaft having a laterally projecting frame adapted to be engaged by the left foot of a vehicle operator and means on the other end adapted to frictionally engage a conventional gas pedal and retaining the frame in a position similarly inclined relative to the gas pedal against downward movement of the frame whereby the free end of the latter may be depressed to rotate the shaft about its longitudinal axis thereby depressing the gas pedal, said frictional engaging means enabling pivotal movement of said attachment about the longitudinal axis of said shaft to position said frame in a substantially horizontal position with the free end adjacent the driver of the vehicle whereby the frame may be engaged by the left foot of a driver to equalize the force of a driver's right foot on the gas pedal and the engaging means to retain a selected gas pedal setting.

7. The combination of claim 6 wherein said frictional engaging means comprises a laterally extending portion terminating in a back turned portion to form a laterally projecting hook.

8. The combination of claim 7 wherein said backturned portion and said shaft are so spaced whereby the confronting surfaces thereof are adapted to frictionally engage the upper and lower surfaces of a conventional gas pedal at spaced points along its length.

9. The combination of claim 8 wherein said frame and said hook project from the same side of said shaft establishing an inclination of said frame similar to the gas pedal.

10. The combination of claim 9 wherein the planes of said hook and said frame form an acute angle so as to establish an inclination of said frame more closely similar to that of the gas pedal.

11. The combination of claim 10 wherein said hook is adapted to slidably embrace a gas pedal so that it may be moved longitudinally of the gas pedal to afford more or less leverage.

References Cited in the file of this patent

UNITED STATES PATENTS

| | | |
|---|---|---|
| 1,074,186 | Maxfield | Sept. 30, 1913 |
| 1,157,099 | Gunderson | Oct. 19, 1915 |
| 1,418,265 | Myers | May 30, 1922 |
| 1,487,090 | Collins | Mar. 18, 1924 |
| 2,187,068 | Adamic | Jan. 16, 1940 |
| 2,658,411 | Eversman | Nov. 10, 1953 |
| 2,914,961 | Ewer | Dec. 1, 1959 |